US009235435B2

(12) United States Patent
Oshins

(10) Patent No.: US 9,235,435 B2
(45) Date of Patent: Jan. 12, 2016

(54) DIRECT MEMORY ACCESS FILTER FOR VIRTUALIZED OPERATING SYSTEMS

(75) Inventor: Jacob Oshins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/555,652

(22) Filed: Jul. 23, 2012

(65) Prior Publication Data

US 2012/0290766 A1  Nov. 15, 2012

Related U.S. Application Data

(62) Division of application No. 12/147,199, filed on Jun. 26, 2008, now Pat. No. 8,230,155.

(51) Int. Cl.
*G06F 9/455* (2006.01)

(52) U.S. Cl.
CPC .................... *G06F 9/45537* (2013.01)

(58) Field of Classification Search
USPC ................................ 710/22; 711/6
See application file for complete search history.

(56) References Cited

U.S. PATENT DOCUMENTS

| 7,334,076 | B2 | 2/2008 | Hendel et al. |
| 2005/0076324 | A1 | 4/2005 | Lowell et al. |
| 2005/0131668 | A1 | 6/2005 | Traut |
| 2005/0235123 | A1 | 10/2005 | Zimmer et al. |
| 2005/0246453 | A1 | 11/2005 | Erlingsson et al. |
| 2006/0070065 | A1 | 3/2006 | Zimmer et al. |
| 2006/0161719 | A1 | 7/2006 | Bennett et al. |
| 2006/0206658 | A1* | 9/2006 | Hendel et al. ............ 711/6 |
| 2006/0271752 | A1 | 11/2006 | Cowan et al. |
| 2007/0083862 | A1 | 4/2007 | Wooldridge et al. |
| 2007/0143395 | A1 | 6/2007 | Uehara et al. |
| 2007/0226736 | A1 | 9/2007 | Johnson et al. |

(Continued)

FOREIGN PATENT DOCUMENTS

| CN | 1811714 A | 8/2006 |
| CN | 1831790 A | 9/2006 |

(Continued)

OTHER PUBLICATIONS

Translated the Japanese Office Action mailed Aug. 6, 2013 for Japanese patent application No. 2011-516405, a counterpart foreign application of U.S. Pat. No. 8,230,155, 4 pages.

(Continued)

*Primary Examiner* — Michael Alsip
(74) *Attorney, Agent, or Firm* — John Jardine; Judy Yee; Micky Minhas

(57) ABSTRACT

Described techniques increase runtime performance of workloads executing on a hypervisor by executing virtualization-aware code in an otherwise non virtualization-aware guest operating system. In one implementation, the virtualization-aware code allows workloads direct access to physical hardware devices, while allowing the system memory allocated to the workloads to be overcommitted. In one implementation, a DMA filter driver is inserted into an I/O driver stack to ensure that the target virtual memory of a DMA transfer is resident before the transfer begins. The DMA filter driver may utilize a cache to track which pages of memory are resident. The cache may also indicate which pages of memory are in use by one or more transfers, enabling the hypervisor to avoid appropriating pages of memory during a transfer.

20 Claims, 9 Drawing Sheets

(56) References Cited

U.S. PATENT DOCUMENTS

| | | | |
|---|---|---|---|
| 2008/0005297 | A1 | 1/2008 | Kjos et al. |
| 2008/0065854 | A1 | 3/2008 | Schoenberg et al. |
| 2008/0141266 | A1* | 6/2008 | Hunt et al. .............. 718/106 |
| 2009/0327576 | A1 | 12/2009 | Oshins |
| 2009/0328074 | A1 | 12/2009 | Oshins |

FOREIGN PATENT DOCUMENTS

| | | |
|---|---|---|
| JP | 2002157133 | 5/2002 |
| JP | 2006196005 | 7/2006 |
| JP | 2006252554 | 9/2006 |
| JP | 2006252565 | 9/2006 |
| TW | 514784 B | 12/2002 |
| TW | 200602869 A | 1/2006 |
| TW | 200622908 A | 7/2006 |
| TW | 200745951 A | 12/2007 |

OTHER PUBLICATIONS

Translated the Japanese Office Action mailed Aug. 13, 2013 for Japanese patent application No. 2012-121967, a counterpart foreign application of U.S. Pat. No. 8,230,155, 4 pages.

Translated the Chinese Office Action mailed Jul. 29, 2013 for Chinese patent application No. 200980124869.4, a counterpart foreign application of U.S. Appl. No. 12/147,199, 6 pages.

The Chinese Office Action mailed Jul. 3, 2012 for Chinese patent Application No. 200980124869.4, a counterpart foreign application of U.S. Appl. No. 12/147,199, 6 pages.

The European Search Report mailed Oct. 7, 2011 for European Patent Application No. 09770712.9, 9 pages.

Gillesple, et al., "Best Practices for Paravirtualization Enhancements from Intel Virtualization Technology: EPT and VT-d", at <<http://softwarecommunity.intel.com/articles/eng/1640.htm>>, Nov. 12, 2007, pp. 3.

Howard, "Hyper-V and Virtualization blog: Hyper-V RTM announcement. Available from the Microsoft Download Centre", at <<http://blogs.technet.com/jhoward/archive/2008/06/26/hyper-v-rtm-announcement-available-today-from-the-microsoft-download-centre.aspx>>, Microsoft Windows Server 2008, Jun. 26, 2008, 16 pages.

"Hyper-V Update for Windows Server 2008 (KB950050)", retrieved on Aug. 22, 2008 at <<http://www.microsoft.com/downloads/details.aspx?FamilyId=6F69D661-5B91-4E5E-A6C0-210E629E1C42&displaylang=en>>, Microsoft Windows Server 2008, 1 page.

Office Action for U.S. Appl. No. 12/147,199, mailed on Jul. 21, 2011, Jacob Oshins, "Direct Memory Access Filter for Virtualized Operating Systems".

Office Action for U.S. Appl. No. 12/147,199, mailed on Nov. 28, 2011, Jacob Oshins, "Direct Memory Access Filter for Virtualized Operating Systems", 15 pgs.

Final Office Action for U.S. Appl. No. 12/242,761, mailed on Aug. 24, 2011, Jacob Oshins, "Direct Memory Access Filter for Virtualized Operating Systems", 11 pages.

PCT Search Report for PCT Application No. PCT/US2009/046462, mailed Dec. 30, 2009 (12 pages).

Pinter, et al., "Improving Machine Virtualization with Hotplug Memory", Proceedings of the 17th International Symposium on Computer Architecture and High Performance Computing, SBAC-PAD'05, IEEE, Oct. 2005, pp. 4.

Waldspurger, "Memory Resource Management in VMware ESX Server", OSDI, Dec. 2002, pp. 14.

Willmann, et al., "Concurrent Direct Network Access for Virtual Machine Monitors", IEEE 13th Intl Symposium on High Performance Computer Architecture, Feb. 2007, 12 pgs.

The Chinese Office Action mailed Mar. 25, 2013 for Chinese patent application No. 200980124869.4, a counterpart foreign application of U.S. Pat. No. 8,230,155, 6 pages.

The Chinese Office Action mailed Oct. 26, 2012 for Chinese patent application No. , a counterpart foreign application of U.S. Pat. No. 8,230,155, 13 pages.

"Office Action and Search Report Received in Taiwan Patent Application No. 98118057", Mailed Date: Jul. 25, 2014, 8 Pages.

"Office Action Issued in European Patent Application No. 09770712.9", Mailed Date: Jul. 29, 2015, 9 Pages.

* cited by examiner

DIRECT MEMORY ACCESS FILTER FOR VIRTUALIZED OPERATING SYSTEMS

This application is a divisional of, and claims priority to, co-pending, commonly-owned U.S. patent application Ser. No. 12/147,199, entitled "DIRECT MEMORY ACCESS FILTER FOR VIRTUALIZED OPERATING SYSTEMS", filed on Jun. 26, 2008, which application is incorporated herein in its entirety by reference.

BACKGROUND

The computer industry is trending toward more and more virtualization at the hardware level. In these environments, operating systems are run on top of a virtual machine monitor or hypervisor, where interaction with the computer hardware is mediated by the virtualization layer. This allows multiple virtualized operating systems, otherwise known as guest operating systems, or guest OSs, to run on a single computer, making it possible to run multiple workloads on the same machine with strong isolation between them. This is particularly beneficial for IT departments or any operation that requires running multiple workloads or multiple server applications. However, the virtualization layer introduces a large performance penalty whenever the isolated operating systems interact with the computer hardware such that the virtualization layer must interfere to maintain isolation. To address this performance penalty, traditional methods have reduced the number of interactions in which the virtualization layer must interfere by allowing the guest operating system direct control over hardware devices. However, granting the guest operating system direct control of these hardware devices has always required that the guest operating system be granted unfettered and exclusive control of all system memory allocated to that guest operating system. By granting exclusive memory access to the guest operating system, many of the benefits of virtualization, including state encapsulation, migration, snap-shots, and check-points, are lost.

SUMMARY

This document describes techniques to increase runtime performance of a guest operating system (guest OS) executing on a hypervisor by allowing the guest OS direct access to physical hardware devices to perform Direct Memory Access (DMA) transfers, while allowing the system memory allocated to the guest OS to be overcommitted. In one implementation, a virtualization-aware DMA filter driver is inserted into the I/O driver stack of a non-virtualization aware operating system. In response to a request by an application to utilize a hardware device for a DMA transfer, the DMA filter driver may delay the start of the requested transfer until the destination memory of the transfer is known to be committed. In one implementation, the filter driver utilizes a cache for tracking, without invoking the hypervisor, upon which pages of memory are committed. In one implementation, if the filter driver knows from the cache that the destination memory pages are committed, then the filter driver allows the requested transfer to begin immediately. If, however, the filter driver knows from the cache that at least one of the destination memory pages are not committed, then the filter driver may request that the hypervisor back all of the non-committed destination memory pages. Upon receiving an indication that all of the destination memory pages are resident, the DMA filter driver may allow the requested transfer to begin.

In one implementation the cache additionally comprises a reference counter associated with each page of memory. In one implementation, before a DMA transfer begins, the filter driver increments the reference counter associated with each page of memory that will potentially be accessed during the transfer. If a memory page's reference counter comprises a positive integer, the hypervisor may not appropriate the page for use by another workload. If, however, a memory page's reference counter is zero, the hypervisor may safely appropriate that memory page for use by another workload. In one implementation, once a transfer has been completed, the filter driver may decrement the reference count of each page associated with the transfer.

In one implementation, the hypervisor may request that the filter driver reset all of the reference counters of the cache. In one implementation, if a workload fails to respond to the hypervisor's request in a timely manner, the hypervisor may terminate the workload.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
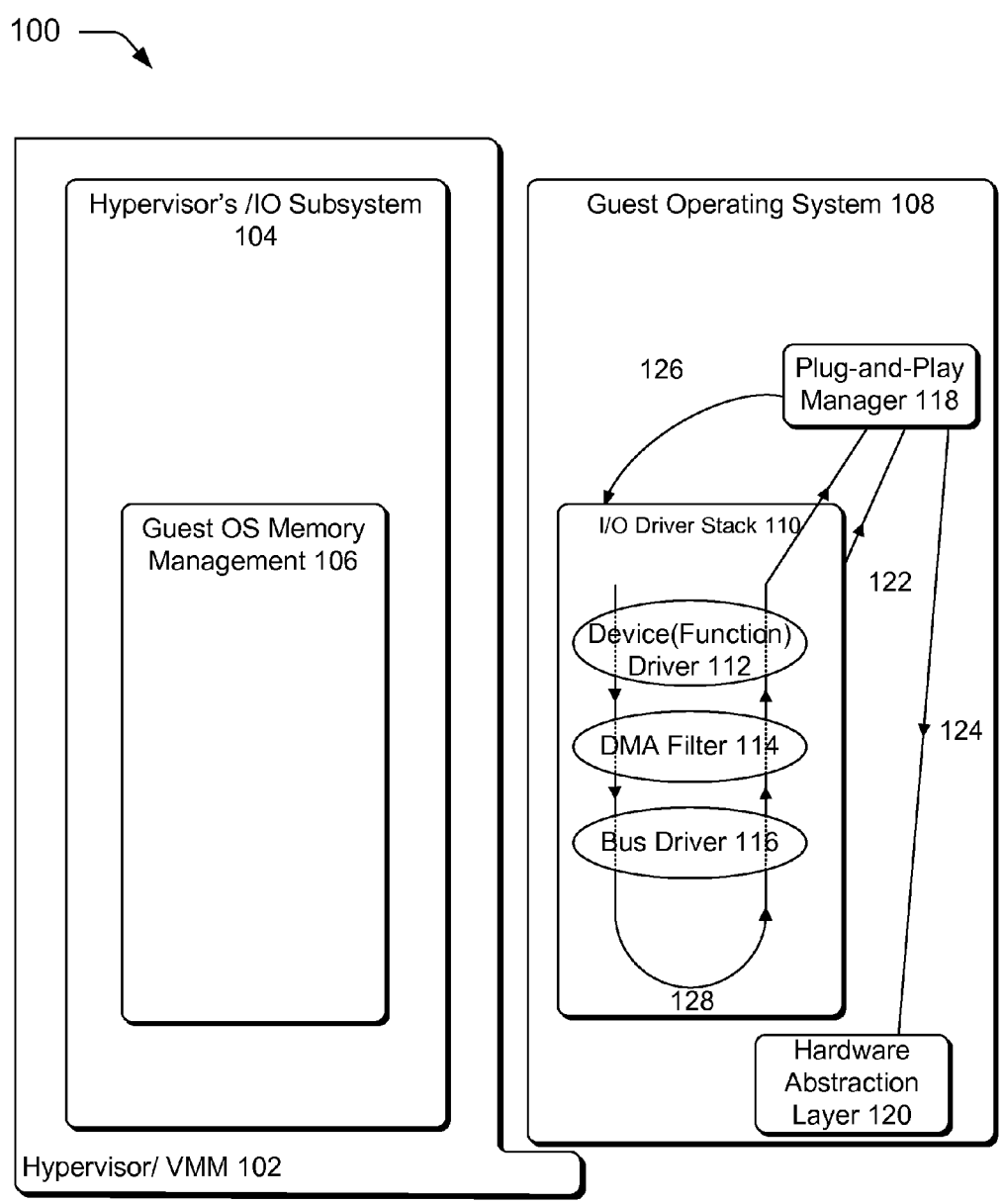
FIG. 1 depicts an illustrative virtualization-aware filter driver inserted into an I/O driver stack of a guest operating system.

The following discussion targets techniques to increase runtime performance of workloads executing on a hypervisor by granting a guest OS direct access to the physical hardware devices, while allowing the guest OS's memory to be overcommitted. A hypervisor, also known as a host, a parent partition, a privileged partition, or a virtual machine manager, is a trusted, supervisory body of code not within the guest OS.

A guest OS, also known as a virtualized OS, executes on a virtual machine created by the hypervisor. A workload may comprise an application executed on the guest OS; or alternatively a workload may refer to the entire software stack, including guest OS, executing on a virtual machine.

In a server environment, a typical workload executing on a server utilizes 15-20% of the host computer's resources. Server computers are configured with this additional processing headroom in order to effectively handle a spike in the server's load with minimal or no downtime. Also, it is common for only one server application to execute on a single machine, because server applications often consume all of the available resources on a machine, and otherwise do not run smoothly with other server applications on the same machine. One potential benefit of executing multiple guest OSs on a single server is the ability to execute multiple server applications, each having its own guest OS, while sharing system resources between workloads.

State encapsulation allows sharing of system resources in a virtual machine system. When a hypervisor maintains state encapsulation of a virtual machine, the hypervisor can appropriate memory pages from one guest OS and give them to another guest OS. This is beneficial when one guest OS is starved for memory while another guest OS has extra memory, allowing the hypervisor to efficiently allocate memory to each guest OS. Another function enabled by state encapsulation is migration. Migration allows a first hypervisor executing on a first machine to transfer an entire virtual machine to a second hypervisor executing on a second machine, while the virtual machine continues running, with little or no loss of data. Additionally, state encapsulation enables creating a snap-shot or check-point. Snap-shots and check-points save the entire state of the virtual machine, allowing a user to seamlessly, and without loss of data, revert to a previous state.

Traditionally, hypervisors allow most computing done within the virtual machines running on top of them to proceed without interruption. However, when the guest OSs executing on these virtual machines attempt to interact with the computer's I/O systems (disks, networks, video, etc.), a traditional hypervisor must intercept this access because these operating systems don't actually own the devices. If the guest OSs were permitted to manipulate the devices directly, the various guest OSs would issue conflicting commands to the devices, causing the computer to crash.

In order to prevent crashes, whenever a guest OS attempts to interact with an I/O system, a traditional hypervisor may have intercepted the call and performed some action equivalent to the action that the guest OS was trying to accomplish. For example, if the guest OS was trying to program a disk controller to read a block of data from a disk, the traditional hypervisor may have stopped the guest OS, read a block of data from a file that contains the contents of the virtual disk, stored the data from the file into memory occupied by the guest OS, and restarted the guest OS. This process may be useful, but slow.

It would be beneficial to allow virtualized operating systems or other workloads to take direct control of all or part of specific devices within the machine, so that access to those devices could occur without interruption from the hypervisor, leading to large performance increases for the virtualized OS.

When a hypervisor creates an environment for a guest OS to run in, it creates a view of memory that looks to the workload as if it owns a contiguous range of physical memory, analogous to what would be available if that guest OS was running on a physical machine. In reality, the memory assigned to the guest OS is almost never contiguous and the addresses that the guest OS uses for addressing its memory are almost never the real physical addresses for that memory. The hypervisor creates and maintains indirection tables (usually called page tables) that fix up these addresses on the fly. It is even possible that some of the memory that the guest OS perceives that it owns doesn't exist or is temporarily loaned out to another guest OS. This creates a problem when the guest OS takes direct control of a real physical I/O device. The guest OS may direct that device to read from or write to memory which doesn't actually exist. It may also direct the device to read from or write to memory using the virtualized addresses of the memory, rather than the real system physical address. This process of reading from or writing to memory directly by an I/O device is called Direct Memory Access or DMA.

One proposed solution to this problem, often called "I/O Page Faults", involves allowing the guest OS to direct the device to perform a DMA transfer. Once the device starts a DMA transfer, the computer's memory controller intercepts the process and directs the hypervisor to reallocate its resources so that physical memory is available at the addresses that the device is trying to access. Then, when the memory is available, and when the proper contents have been loaded into the memory, the transfer is allowed to proceed. This solution does not involve changing software within the guest OS. However, this solution requires that the device tolerate an almost unbounded amount of time from when the device initiates a transaction to when the transaction is allowed to proceed. This delay is unbounded because the hypervisor is made aware of the transfer after the transfer has already begun, and so any processing that ensures actual physical memory is available for the transfer, including reading from a swap-file, occurs while the hardware device continues to receive or transmit data into or from a buffer.

This latency can be dealt with by building very large buffers into the device, thereby significantly increasing the cost of the device. Alternatively, this latency can be reduced if the hardware device interrupts a device driver running within the hypervisor before the transfer begins. Upon being interrupted, the device driver within the hypervisor ensures that the target memory is committed. However, this interrupt is itself a performance problem because invoking the hypervisor is an expensive operation.

In one implementation, a software component is inserted into a guest OS to suspend an I/O transaction at the software layer, before the transaction begins, and to ensure that while the transaction is suspended the virtual memory targeted by the transaction is backed by actual physical memory. Suspending the transaction in order to ensure the target virtual memory is committed enables the transaction to take place without interruption, eliminating the arbitrary latencies caused by the I/O page faults method. Suspending the transaction at the software layer before the transaction begins also does not require sending an interrupt to the hypervisor, or otherwise communicating with the hypervisor.

FIG. 1 depicts an illustrative virtual machine environment 100, which may be executed on a computer. The environment includes a hypervisor 102 executing directly on the computer. The computer may in one implementation be a server computer having the resources necessary to run multiple workloads, each workload executing on its own guest OS instance. In another environment the computer may be a personal computer, such as a desktop or laptop computer, enabling a user to simultaneously run multiple operating systems. In one implementation the hypervisor contains a hypervisor I/O sub-system 104. The hypervisor I/O sub-system 104 may control all of the hardware resources on the computer, ensuring that multiple guest operating systems do not issue conflicting commands to the actual hardware devices. The hypervisor I/O sub-system 104 may include a guest OS memory management component 106 for allocating and controlling the virtual resources allocated to a virtual machine.

The hypervisor 102, hypervisor I/O sub-system 104, and the guest OS memory management component 106 may cooperatively create a virtual machine on which a guest operating system 108, or guest OS 108, executes. In one implementation the guest OS 108 may be enlightened, meaning it is aware of whether it is running on top of a virtual machine or on top of a physical machine. An enlightened guest OS may utilize resources differently when executing on a virtual machine than on a physical machine, based on different assumptions made about virtualized resources and physical resources. Additionally, an enlightened guest OS may interact with the hypervisor 102 to share resources. In one implementation, an enlightened guest OS may cooperatively request virtual memory from the hypervisor 102 or relinquish virtual memory to the hypervisor 102 for use by another guest OS.

In another implementation, the guest OS 108 is unaware that it is executing on a virtual machine. This "un-enlightened" guest OS 108, also known as a non virtualization-aware or un-cooperative guest OS 108, may exhibit worse performance on a virtual machine than an enlightened, but otherwise identical, guest OS. An un-enlightened guest OS 108 may operate exactly the same on a virtual machine as it does on a physical machine.

Many operating systems provide a software abstraction for Direct Memory Access that device drivers typically use. This abstraction involves several programming interfaces and objects that allow a device driver to present a list of physical addresses, typically in the form of a memory descriptor list or MDL, and receive a list of device logical addresses in return, typically in the form of a scatter/gather list.

Physical addresses may be system physical addresses used by a hypervisor to read or write real physical memory. Alternatively, physical addresses may appear as real physical addresses to the guest OS 108, but are in fact virtualized addresses known as guest physical addresses. Device logical addresses, on the other hand, are addresses used by a hardware device to read or write to physical memory. Once the scatter/gather list of device logical addresses is returned from the interface, a device driver may program its hardware to actually carry out the associated reads and writes.

Many operating systems allow, through this DMA abstraction, for an add-in component to extend DMA functionality. In one implementation, a DMA filter 114 may insert itself into the process by which a device driver 112 retrieves pointers to the functions it calls when it needs to convert physical addresses to device logical addresses. In another environment, a virtualization-aware hardware abstraction layer (HAL) 120 may be inserted into the non virtualization-aware guest OS 108, causing the guest OS 108 to exhibit enlightened behavior. Through these means, a virtualization-aware component may be inserted into a non virtualization-aware guest OS 108, causing the non virtualization-aware guest OS 108 to exhibit behavior similar to an enlightened guest OS.

In one implementation, the device driver 112 may initiate a DMA transfer to write data to or read data from a hardware device. The device driver 112 may send a request 122 to a plug-and-play manager 118, the request 122 including a range of memory defined in the guest physical address of the guest OS. In one implementation, the plug-and-play manager 118 may send a request 124 to the hardware access layer 120 for pointers functions used to convert the range of memory from guest physical addresses to bus-relative addresses.

Upon receiving the request 124, the virtualization-aware hardware access layer 120 may communicate with the hypervisor 102, ensuring that the memory associated with the DMA transfer is committed before allowing the transfer to begin.

In another implementation, the DMA filter 114 is inserted into an I/O driver stack 110. In one implementation the DMA filter 114 may receive I/O Request Packets (IRPs) that are used to communicate within the I/O driver stack 110. One of the IRPs may be a request 126 from a device driver 112 for pointers to the functions used to convert a range of guest physical memory addresses to a range of bus-relative addresses. The virtualization-aware DMA filter 114 may communicate with the hypervisor 102 upon receiving the request 126, ensuring that the memory associated with the DMA transfer is committed before allowing the transfer to begin. A message 128 is returned to the plug-and-play manager 118 to allow the transfer to begin.

Figure 2:
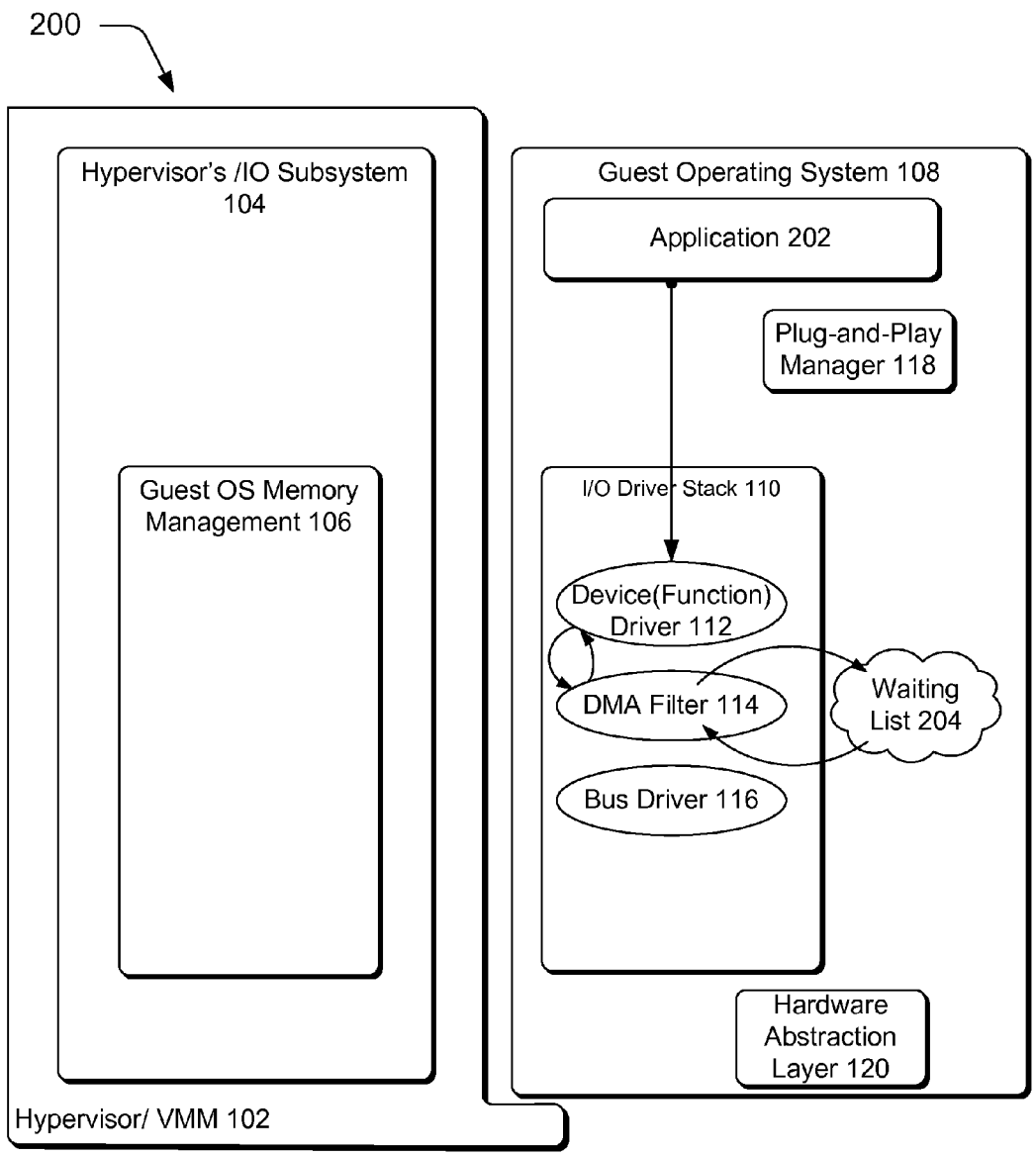
FIG. 2 depicts an illustrative virtualization-aware filter driver receiving a DMA transfer request from and application and caching the request on a waiting list.

FIG. 2 depicts an illustrative virtual machine environment 200, executed on a computer. In one implementation, the DMA filter 114 suspends a requested DMA transfer in order to ensure the memory necessary for the transaction is committed. A requested DMA transfer comprises a range of memory addresses. While these memory addresses appear to the guest OS 108 as physical memory addresses, and therefore immediately usable for a DMA transfer, these addresses may actually be guest physical memory addresses, a form of virtual memory addresses, that do not map to actual physical memory addresses. Additionally, some of these guest physical memory addresses may not currently be mapped to real physical memory addresses, because the hypervisor 102 has appropriated some of the actual physical pages of memory for use by another guest OS. Before a DMA transaction can safely take place in the guest OS 108 without intervention by the hypervisor 102, the memory referenced by the transaction must be committed for the lifetime of the transaction, and the memory addresses referenced by the transaction must have a valid translation between guest physical address space and system physical address space. The DMA filter 114 may in one implementation communicate with the guest OS memory management component 106 to ensure that all of the memory pages referenced by the transaction are committed. In one implementation, the DMA filter 114 may communicate with the guest OS memory management component 106 to request that the guest OS memory management component 106 commit all of the uncommitted memory pages referenced by the transaction.

In one implementation, a transaction begins in an application 202 (for instance, a read from disk) and is passed down to the device driver 112 for the hardware device that will handle the transaction. The device driver 112 then uses its DMA interface to request device logical addresses for the destination memory referenced by the transaction. The DMA filter 114 may intercept this request for device logical addresses and put the transaction on a waiting list 204 until the referenced memory has been committed and a valid translation exists. Then the DMA DMA filter 114 may present the transaction, along with a resulting set of logical addresses back to the device driver 112, which may then program the hardware to make the transfer of data through DMA.

Figure 3:
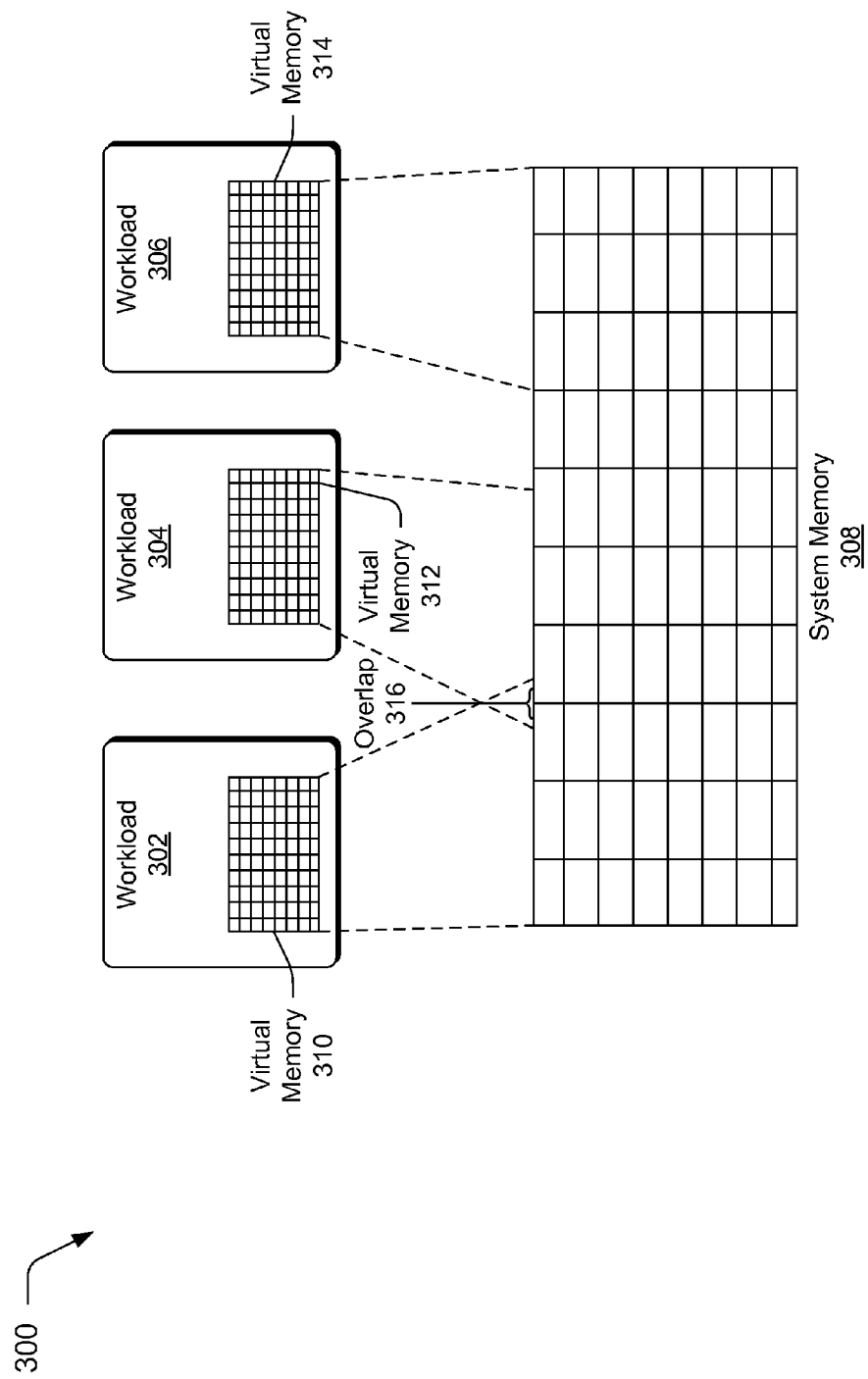
FIG. 3 depicts an illustrative system for sharing system memory between workloads.

FIG. 3 depicts an illustrative virtual memory sharing environment 300, executed on a computer. In one implementation, a workload 302, a workload 304, and a workload 306 all execute on a hypervisor, and each workload may be allocated to a portion of a system memory 308. The workloads 302-306 may execute a database, an email server, a web server, or an OLAP server, among other server tasks. The workload 302 may use a virtual memory 310, which may be mapped to the system memory 308. The workload 304 and 306 similarly may use virtual memories 312 and 314, each mapped to the system memory 308. Each page of the virtual memory 310 of the workload 302 may be mapped to a page of memory in the system memory 308. However, it is possible for the hypervisor to steal a page of memory away from the workload 302 and supply it as a page of the workload 304. It is thereby possible for two workloads to point to the same portion of physical memory, as indicated by an overlap 316, or for one workload to think it owns a memory page that has actually been appropriated for use by another workload. In this case, the guest operating system on which the workloads 302 and 304 are executing are overcommitted, because the guest OS memory management component of the hypervisor has allocated more virtual memory to the workloads than is actually available in the system memory 308. If the workload 302 attempted to access memory contained in the overlap 316, the hypervisor might intervene and supply the workload 302 with a new page of memory, optionally copying a value into the new page of memory from a swap-file.

Memory sharing is one example of a technique enabled by maintaining state encapsulation around a virtual machine. By allowing virtual memory techniques, a hypervisor may share pages of memory between workloads, quickly migrate a running workload, and snap-shot or check-point a workload. These techniques are enabled by the hypervisor's ability to steal or appropriate pages of memory from a guest OS, without leading to an unstable environment.

Figure 4:
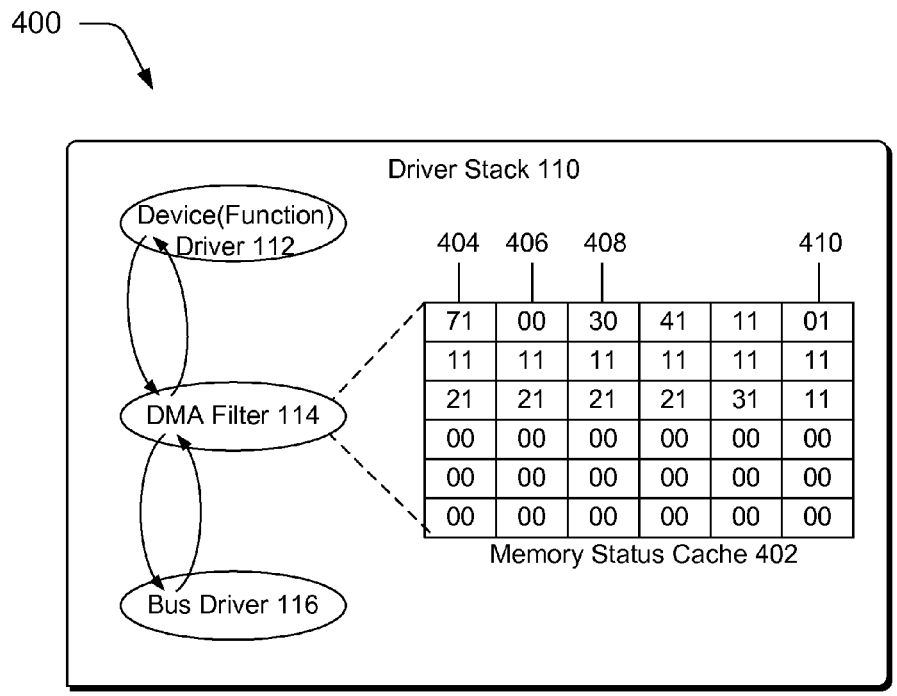
FIG. 4 depicts an illustrative cache, each element of the cache mapped to a page of memory.

FIG. 4 depicts an illustrative driver stack 400. In one implementation, the process of ensuring that target pages of memory are committed requires sending a message to the guest OS memory manager 106 and receiving a response message. In another implementation, responsiveness may increase by introducing a memory status cache 402 for reducing or eliminating the number of times the DMA filter 114 must communicate with the hypervisor 102. The memory status cache 402 may store an array indicating which memory pages of the system memory 308 are committed. The memory status cache 402 may be stored in the DMA filter 114, so that it may be accessed completely in the context of the guest OS 108 without invoking the hypervisor 102. The memory status cache 402 may comprise 4 bits for each page of memory. In one embodiment, one bit may be used to indicate whether a page is committed, while the remaining 3 bits may count the number of active DMA transfers that are associated with that memory page. This system allows the memory status cache 402 to track up to 7 concurrent DMA transactions. For instance, a memory status cache entry 404 indicates that the associated page of memory is involved in 7 DMA transactions, and that the page is currently resident. A memory status cache entry 406 indicates that the associated page of memory is not involved in any DMA transactions, and is currently not committed to a real, physical page of memory. By not being committed, any DMA transaction that attempted to write to or read from the memory page associated with the status cache entry 406 would result in corruption of data or a crash, as the value may be written to memory assigned to another workload, or to memory that does not exist at all.

One of the purposes of tracking the number of DMA transfers associated with a page of memory is to ensure the hypervisor 102 will not steal a page from the guest OS 108 that is currently in use by a DMA transaction. Therefore, all pages of memory contained in a range of memory currently in use by a DMA transaction will remain committed at least until all associated DMA transactions are completed. Therefore, a memory status cache entry 408 indicates an error—three DMA transactions are operating on the associated memory page, but the page is not currently committed. Accordingly, before the hypervisor 102 steals a memory page from one workload and gives it to another, it may first determine whether a virtualization-aware component embedded in the guest OS 108 knows that the memory page is currently in use.

If a DMA transaction is initiated, and all of the memory pages associated with the transaction are committed, the DMA filter 114 may increase the reference count, or pin-count, of the memory status cache entries associated with the memory pages associated with the DMA transaction. The DMA filter 114 may then immediately allow the transaction to begin.

A memory status cache entry 410 indicates that there are no active DMA transactions using the associated memory page, but that the page is currently committed. If a DMA transfer requested to use pages similar to those associated with the memory status cache entry 410, the DMA transfer would be allowed to continue immediately, directly accessing the underlying hardware.

In one implementation, the hypervisor may request that the DMA filter 114 reset all of the reference counters of the memory status cache 402. Additionally or alternatively, if a workload fails to respond to the hypervisor's request in a timely manner, the hypervisor may terminate the workload.

In one implementation, the memory status cache 402 is not present. In this case, the device driver must be paused and all transactions must be retired before the hypervisor de-commits any pages. This strategy is preferable in some circumstances, as it greatly reduces the memory required to implement the cache.

Optimal performance comes when most or all of the guest memory remains committed, and most DMA transactions begin without the need to communicate with the guest OS memory manager.

Figure 5:
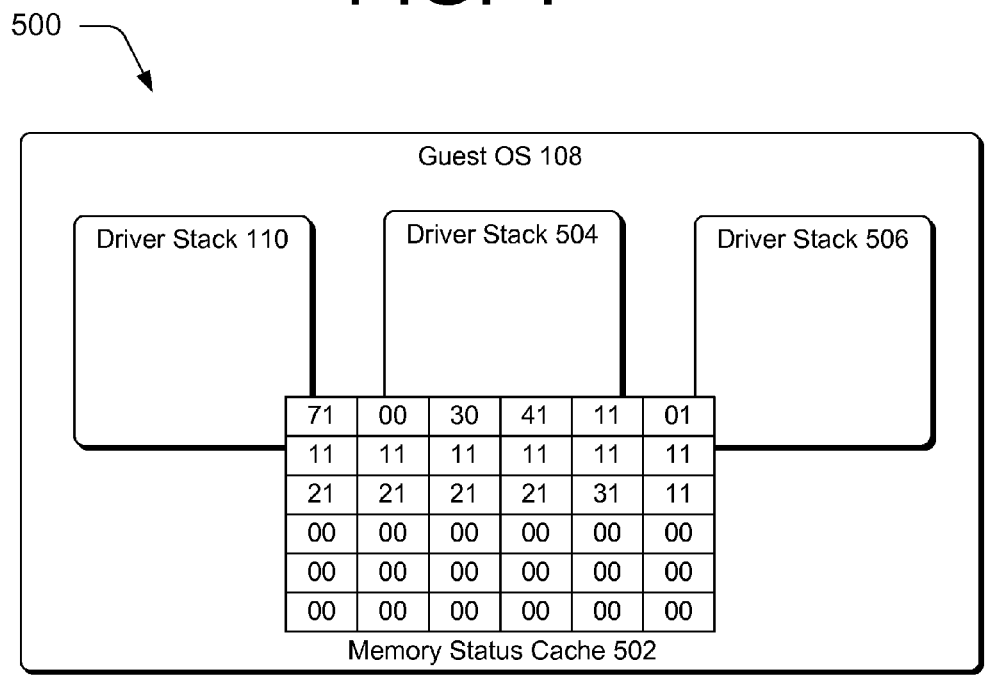
FIG. 5 depicts a guest operating system comprising a plurality of driver stacks, each of the driver stacks utilizing a single same cache.

FIG. 5 depicts an illustrative plurality of driver stacks 500. In one implementation, a first driver stack 110, a second driver stack 504, and a third driver stack 506 all share the same memory status cache 502. Multiple driver stacks may instantiate different instances of the DMA filter 114; however, all of the virtualization-aware DMA filters are managing the same virtual memory. Consequently, all DMA filters operate on the same memory status cache in order to reduce the overhead required to maintain the cache, and to minimize communication between the DMA filter 114 and the hypervisor. For example, if the driver stack 506 initiated a DMA transfer involving virtual address 0x0012384C, but did not share the memory status cache 502 with the other instances of the DMA filter, every time the hypervisor wanted to appropriate a memory page from the guest OS, it would have to inspect every memory status cache to ensure a memory page actively involved in a DMA transfer was not appropriated.

Figure 6:
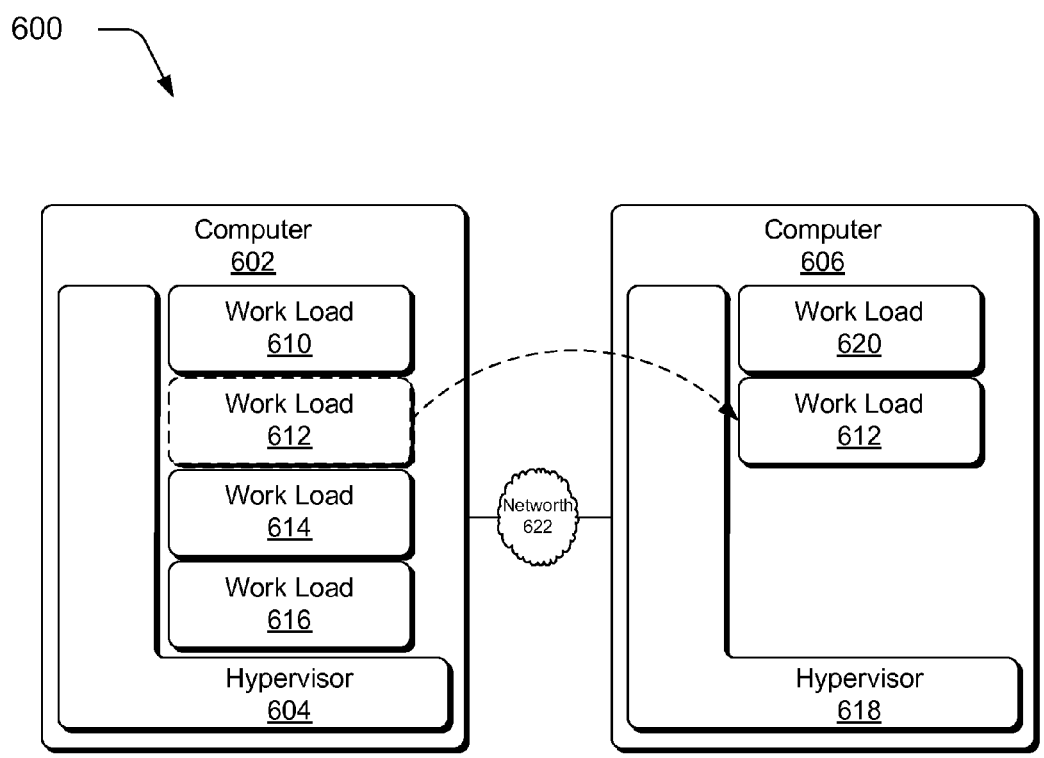
FIG. 6 depicts an illustrative process for migrating a workload.

FIG. 6 depicts an illustrative migration environment 600. According to this implementation, state encapsulation may enable a hypervisor 604 running on a computer 602 to be migrated to a hypervisor 608 running on a computer 606. In one environment workloads 610 through 616 are executing on the hypervisor 604. The workload 612 may need to be migrated to the hypervisor 608 over a network 622. The migration is performed by copying memory pages from the hypervisor 604 to the hypervisor 608, while the migrating workload 612 continues to function. The migration begins by invalidating every page in the workload 612, so that any subsequent memory access made by the workload 612 will trap into the hypervisor 604. The hypervisor 604 then begins transferring all of the valid pages of memory to the hypervisor 608. During this transfer, the workload 612 continues to execute on the hypervisor 604. Memory pages that are accessed during the transfer are marked as dirty, and left on the hypervisor 604, while memory pages that are not marked as dirty, indicating that they haven't been touched, continue to be transferred to the hypervisor 608. Eventually, all of the clean pages have been transferred, and only dirty pages that have been touched by the workload 612 remain. At this point, the workload 612 may be paused to allow the remaining dirty pages to be transferred to the hypervisor 608. Once all of the pages have been transferred to the hypervisor 608, the workload 612 is started on the hypervisor 608, usually not more than 300 milliseconds after the workload 612 was paused by the hypervisor 604. Typically, the migration occurs without dropping a connection.

Figure 7:
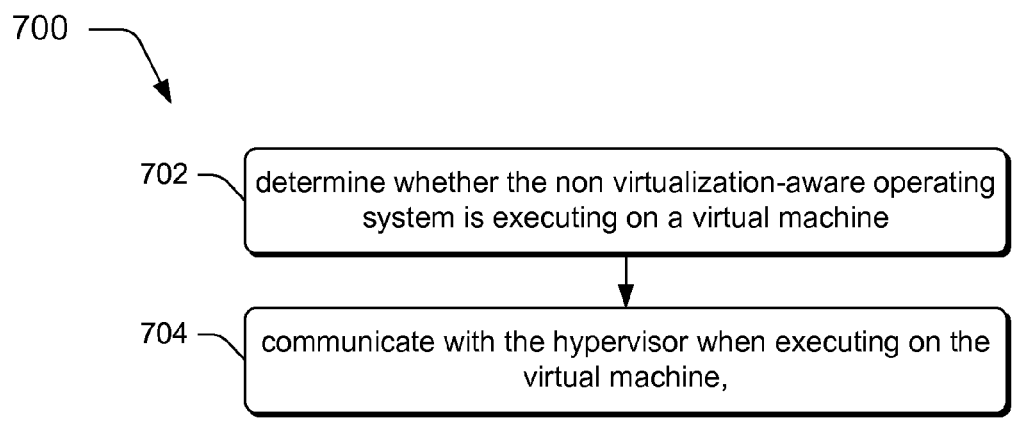
FIG. 7 depicts an illustrative process for inserting virtualization-aware software into a non virtualization-aware operating system, such that the non virtualization-aware operating system exhibits different behavior when executed on a virtual machine than when executed on a physical machine.

FIG. 7 depicts an illustrative process for enhancing a non virtualization-aware operating system with a virtualization-aware software component. Operation 702 represents determining, with a virtualization-aware software component installed in the I/O driver stack 110, whether the system is executing on a virtual machine. In one embodiment the virtualization-aware software component comprises the DMA filter 114. Additionally, or alternatively, the virtualization-aware software component may comprise the HAL 120. Operation 704, meanwhile, represents the virtualization-aware software component communicating with the hypervisor 102 when executing on the virtual machine.

Figure 8:
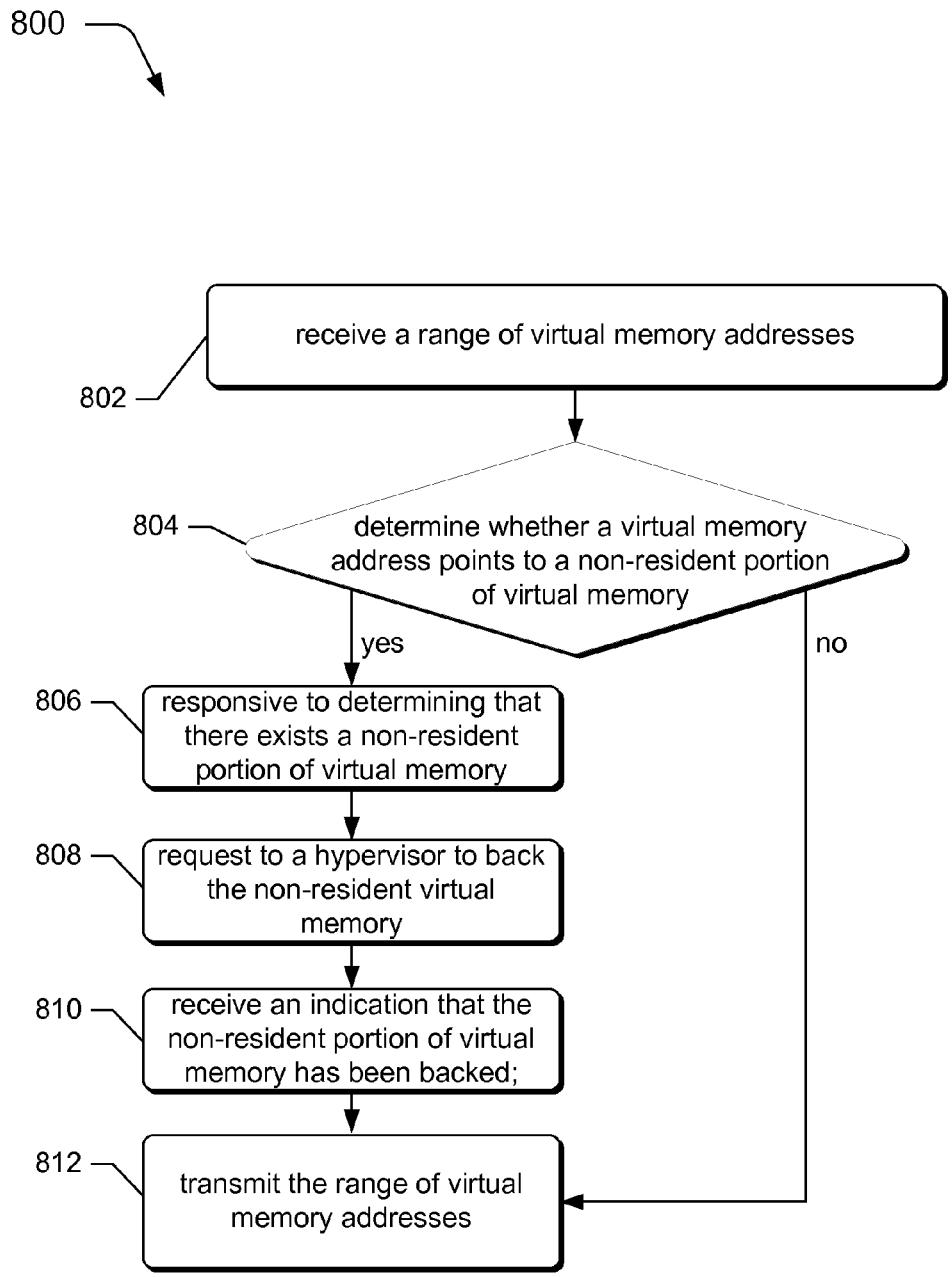
FIG. 8 depicts an illustrative process for receiving a range of memory addresses, determining whether the memory pointed to by the range is resident, and, if the virtual memory is not resident, requesting that the hypervisor make it resident before transmitting the range of memory addresses.

FIG. 8 depicts an illustrative process for delaying, in software, the beginning of a DMA transfer until the memory associated with the transfer is known to be backed by physical memory. Operation 802 represents receiving a range of virtual memory addresses. In one implementation, the range of virtual memory addresses comprises a source or destination of the DMA transfer. The received virtual memory addresses may be later translated into device logical addresses, allowing a hardware device used in the transfer to natively address physical memory. Operation 804, meanwhile, represents determining whether any of the virtual memory pointed to by the received virtual memory addresses are not backed, otherwise known as not resident. If none of the addresses are non-resident, meaning that all of the request addresses are resident, then the received range of virtual memory addresses is transmitted. In one embodiment, the range of virtual addresses is transmitted to a component that translates virtual memory addresses into device logical addresses. Operation 806, meanwhile, represents positively determining that there is at least one non-backed or non-resident portion of memory referenced in the received range of virtual memory addresses. Operation 808, meanwhile, represents requesting the hypervisor 102 to back, or make resident, the non-resident portion of the received virtual memory addresses. Operation 810, meanwhile, represents receiving an indication from the hypervisor 102 that all non-resident portions pointed to by the received virtual memory addresses has been backed. Operation 812, meanwhile, represents transmitting the range of virtual memory addresses.

Figure 9:
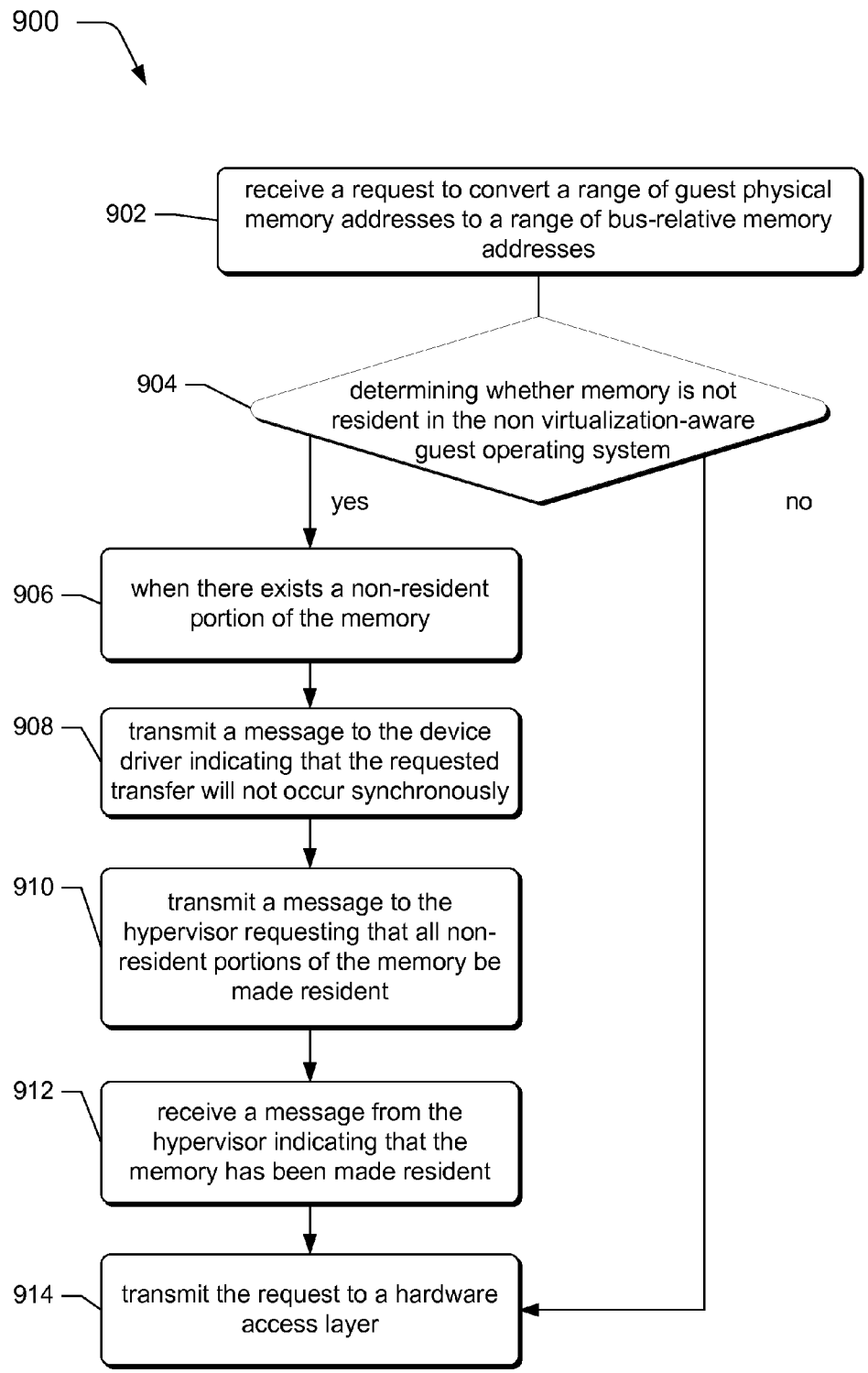
FIG. 9 depicts an illustrative process for receiving a request to convert a range of memory addresses, determining whether the requested memory is resident, and if the requested memory is not resident requesting the hypervisor make it resident before transmitting the request to a hardware access layer.

FIG. 9 depicts an illustrative process for delaying, in software, the beginning of a DMA transfer until the virtual memory associated with the transfer is known to be backed by real physical memory. Operation 902 represents receiving a request to convert a range of guest physical memory addresses to bus-relative memory addresses. Operation 904, meanwhile, represents determining whether any of the received guest physical memory addresses are not backed by real physical memory. If all of the guest physical memory addresses are backed, then the received request is transmitted to the HAL 120. Operation 906, meanwhile, represents positively determining when there is at least one non-backed or non-resident portion of guest physical memory referenced in the received request. Operation 908, meanwhile, represents transmitting a message to the device driver 112 indicating that the transfer may not occur synchronously. In one embodiment, the received request is stored in the waiting list 204. Operation 910, meanwhile, represents transmitting a message to the hypervisor 102, requesting that the hypervisor 102 back, or make resident, the non-resident portions of guest physical memory contained in the received request. Operation 912, meanwhile, represents receiving a message from the hypervisor 102 that all non-resident portions pointed to by the guest physical addresses contained in the received request have been backed by real, physical memory. Operation 914, meanwhile, represents transmitting the request to the HAL 120.

Figure 10:
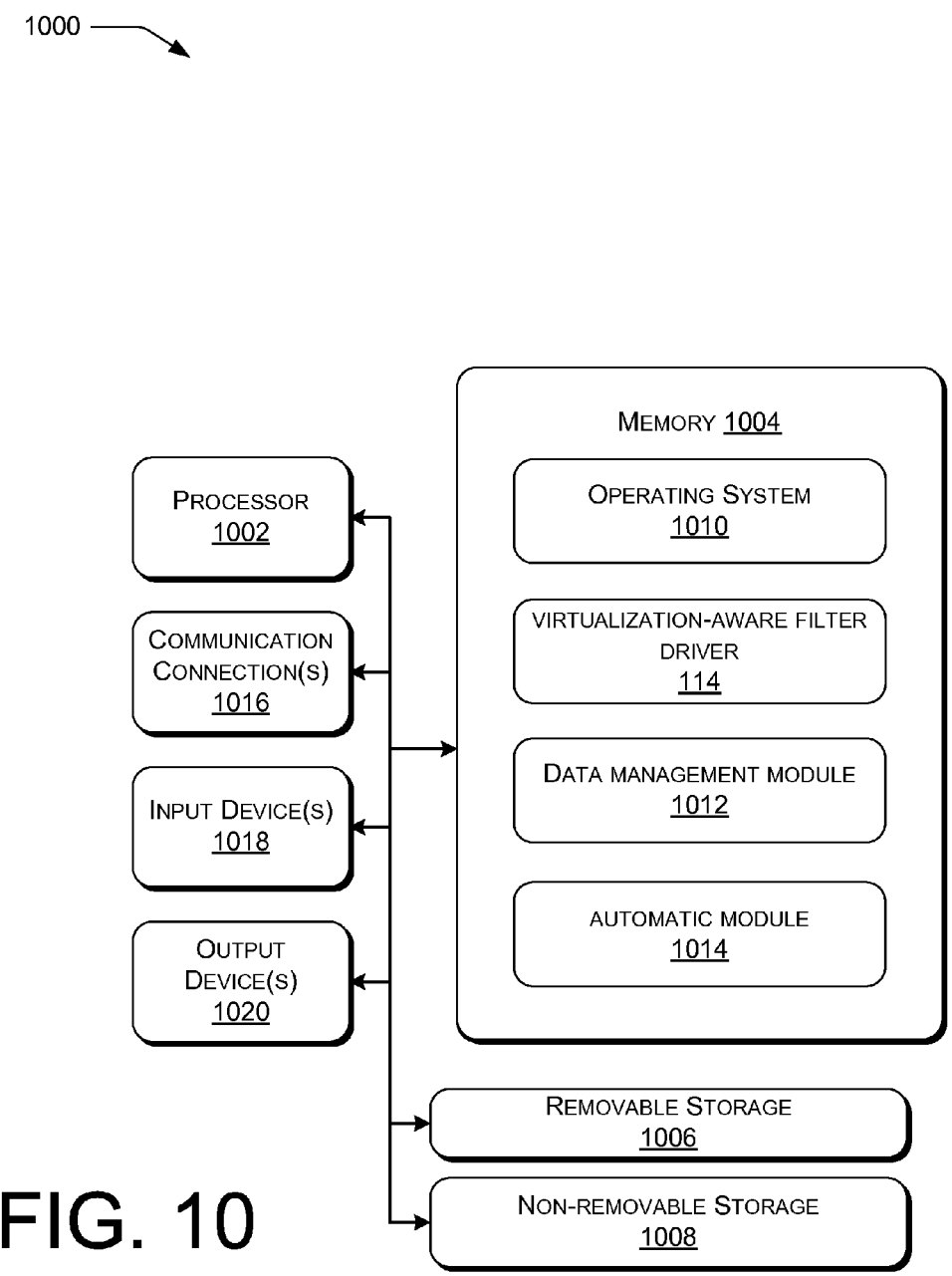
FIG. 10 depicts an illustrative processing functionality to create a virtualization-aware filter driver.

FIG. 10 illustrates an exemplary processing functionality 1000 to create a virtualization-aware DMA filter driver, or DMA filter 114. The processing functionality 1000 may be configured as any suitable computing device or server capable of implementing a soft hang analysis and detection system. In one exemplary configuration, the processing functionality 1000 comprises at least one processing unit 1002 and memory 1004. The processing unit 1002 may be implemented as appropriate in hardware, software, firmware, or combinations thereof. Software or firmware implementations of the processing unit 1002 may include computer- or machine-executable instructions written in any suitable programming language to perform the various functions described.

Memory 1004 may store programs of instructions that are loadable and executable on the processor 1002, as well as data generated during the execution of these programs. Depending on the configuration and type of computing device, memory 1004 may be volatile (such as RAM) and/or non-volatile (such as ROM, flash memory, etc.). The computing device or server may also include additional removable storage 1006 and/or non-removable storage 1008 including, but not limited to, magnetic storage, optical disks, and/or tape storage. The disk drives and their associated computer-readable media may provide non-volatile storage of computer readable instructions, data structures, program modules, and other data for the computing devices.

Memory 1004, removable storage 1006, and non-removable storage 1008 are all examples of computer storage media. Computer storage media includes volatile and non-volatile, removable and non-removable media implemented in any method or technology for storage of information such as computer readable instructions, data structures, program modules or other data. Memory 1004, removable storage 1006, and non-removable storage 1008 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the server or other computing device.

Turning to the contents of the memory 1004 in more detail, the memory 1004 may include an operating system 1010 and one or more application programs or service for implementing the soft hang analysis and detection program 100. In one implementation, the memory 1004 includes a data management module 1012 and an automatic module 1014. The data management module 1012 includes but is not limited to identifying and tracking a session. The automatic module 1014 stores and manages information, such as session identifier, session state, computing devices of the user, and the like, and may communicate with one or more local and/or remote databases or services.

The memory 1004 further includes a user interface module 1016 and a session module 1018. The user interface module 1016 presents the user with the user interface to log in or log off, in and out of a session, and the like. The session module 1018 includes but is not limited to, tracking a state of the computing devices, logging in or logging off, connecting or disconnecting, and the like. The session module 1018 performs connections, disconnections, search functions, such as performing searches to identify the client devices that are logged on, logged off, state of the client devices, the status of the user, and the like.

The processing functionality 1000 may also contain communications connection(s) 1016 that allow the processing functionality 1000 to communicate with a stored database, another computing device or server, the user terminals, and/or other devices on the network. Communications connection(s) 1016 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 1000 may also include input device(s) 1018 such as a keyboard, mouse, pen, voice input device, touch input device, etc., and output device(s) 1020, such as a display, speakers, printer, etc. The processing functionality 1000 may include a database hosted on the processing functionality 1000 including, but is not limited to, session data, network addresses, list of computing devices, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A method comprising:
    overcommitting, using a hypervisor operating as a virtual memory manager, one or more system physical addresses referenced by one or more guest physical addresses of a non virtualization-aware operating system;
    receiving, at a virtualization-aware software component installed in a driver stack of the non virtualization-aware operating system, the virtualization-aware software component being distinct from the hypervisor, a transaction request to begin a transaction associated with a range of guest physical addresses including the one or more guest physical addresses;
    determining, at the virtualization-aware software component, that the one or more guest physical addresses are not resident to the non virtualization-aware operating system; and
    transmitting, from the virtualization-aware software component and in response to the determining, a backing request to the hypervisor to make resident the one or more system physical addresses to the non virtualization-aware operating system.

2. The method as recited in claim 1, wherein the virtualization-aware software component comprises a filter driver inserted into an input/output (I/O) driver stack of the non virtualization-aware operating system.

3. The method as recited in claim 1, wherein the driver stack comprises a direct memory access driver.

4. The method as recited in claim 1, further comprising:
    receiving, by the virtualization-aware software component, an indication that the transaction is complete.

5. The method as recited in claim 1, further comprising:
    providing, by the virtualization-aware software component, indicators in a data structure individually associated with portions of a guest physical address space, one or more indicators of the indicators comprising a representation of whether a corresponding portion of system physical memory is resident or non-resident.

6. The method as recited in claim 5, wherein the one or more indicators of the indicators further comprise a reference count of in-progress memory transfers, the in-progress memory transfers targeting a corresponding range of guest physical addresses that comprise the portion of the guest physical address space associated with the one or more indicators.

7. The method as recited in claim 6, further comprising:
    in response to a notification of the hypervisor, updating, by the virtualization-aware software component, the reference count associated with individual portions of the guest physical address space.

8. The method as recited in claim 7, further comprising:
    terminating, using the hypervisor, a virtual machine hosted by the hypervisor used to execute the non virtualization-aware operating system when the virtualization-aware software component fails to update the reference count associated with the individual portions of the guest physical address space.

9. The method as recited in claim 5, wherein the range of guest physical addresses comprises a target of an asynchronous-direct memory access transfer.

10. The method as recited in claim 5, further comprising:
    accessing, by multiple instantiations of the virtualization-aware software component, a same data structure that includes indicators individually associated with portions of a system physical address space.

11. The method as recited in claim 1, wherein the transaction request comprises an I/O request packet for communicating a request of a device driver.

12. The method as recited in claim 1, wherein the hypervisor enables the non virtualization-aware operating system to directly control a hardware device of a computer system.

13. The method as recited in claim 1, further comprising:
executing the non virtualization-aware operating system in a workload hosted by the hypervisor, wherein the hypervisor is executed in a first non-virtual computer system; and
utilizing state encapsulation to migrate the workload to a second non-virtual computer system.

14. A computer system comprising:
one or more processors;
system physical memory, accessible by the one or more processors; and
a hypervisor hosting a virtual machine having a non virtualization-aware operating system with a driver stack;
a virtualization-aware component associated with the driver stack, the virtualization-aware component distinct from the hypervisor and stored in the system physical memory and executable on the one or more processors to:
  receive a range of guest physical addresses including one or more guest physical addresses associated with one or more overcommitted system physical addresses;
  determine whether at least one guest physical address of the range of guest physical addresses references a non-resident portion of a guest physical address space;
  responsive to determining that the at least one guest physical address references the non-resident portion of the guest physical address space:
    transmit a request to the hypervisor to commit the non-resident portion of the guest physical address space;
    receive a message from the hypervisor indicating that the non-resident portion of the guest physical address space has been committed; and
    transmit the range of virtual memory-addresses.

15. The computer system as recited in claim 14, wherein the virtualization-aware component is further executable to:
receive an indication that a memory transfer associated with the range of guest physical addresses is complete.

16. The computer system as recited in claim 15, wherein the virtualization-aware component is further executable to:
responsive to determining that the at least one guest physical address references the non-resident portion of the guest physical address space, transmit a message to the driver stack indicating that the memory transfer is not to occur synchronously.

17. The computer system as recited in claim 16, wherein the virtualization-aware component is configured to transmit the range of guest physical addresses responsive to receiving the message from the hypervisor indicating that the non-resident portion of the guest physical address space has been committed.

18. The method as recited in claim 1, wherein the backing request comprises an indication of the range of guest physical addresses, and wherein the transmitting the backing request to the hypervisor occurs before an initiation of the transaction.

19. The method as recited in claim 1, wherein the hypervisor makes resident the range of guest physical addresses for a duration of the transaction.

20. One or more computer-readable storage devices storing computer-executable instructions that, when executed by one or more processors, cause the one or more processors to perform operations comprising:
overcommitting, using a hypervisor operating as a virtual memory manager, one or more system physical addresses referenced by one or more guest physical addresses of a non virtualization-aware operating system;
receiving, at a virtualization-aware software component installed in a driver stack of the non virtualization-aware operating system, the virtualization-aware software component being distinct from the hypervisor, a transaction request to begin a transaction associated with a range of guest physical addresses including the one or more guest physical addresses;
determining, at the virtualization-aware software component, that the one or more guest physical addresses are not resident to the non virtualization-aware operating system; and
transmitting, from the virtualization-aware software component and in response to the determining, a backing request to the hypervisor to make resident the one or more system physical addresses to the non virtualization-aware operating system.

\* \* \* \* \*